(12) United States Patent
Chan et al.

(10) Patent No.: US 9,882,732 B2
(45) Date of Patent: *Jan. 30, 2018

(54) ATTACHMENT COLLABORATION WITHIN MESSAGE ENVIRONMENTS

(71) Applicant: Microsoft Technology Licensing, LLC, Redmond, WA (US)

(72) Inventors: Philip Yue-Leung Chan, Redmond, WA (US); Nathan F. Waddoups, Redmond, WA (US); Michael Patrick Loughry, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/255,681

(22) Filed: Sep. 2, 2016

(65) Prior Publication Data

US 2016/0373266 A1    Dec. 22, 2016

Related U.S. Application Data

(63) Continuation of application No. 13/716,088, filed on Dec. 15, 2012, now Pat. No. 9,438,546.

(51) Int. Cl.
*G06F 15/16* (2006.01)
*H04L 12/18* (2006.01)
*H04L 12/58* (2006.01)

(52) U.S. Cl.
CPC .......... *H04L 12/1813* (2013.01); *H04L 51/04* (2013.01); *H04L 51/08* (2013.01); *H04L 51/22* (2013.01)

(58) Field of Classification Search
CPC ..... H04L 51/08; H04L 12/1813; H04L 51/22; H04L 51/04; H04L 12/58; H04L 12/18; G06F 15/16
See application file for complete search history.

(56) References Cited

U.S. PATENT DOCUMENTS

| 5,781,901 | A | | 7/1998 | Kuzma | |
|---|---|---|---|---|---|
| 5,903,723 | A | * | 5/1999 | Beck | G06F 17/22 707/999.01 |
| 5,930,471 | A | * | 7/1999 | Milewski | G06Q 10/107 709/204 |
| 6,529,905 | B1 | | 3/2003 | Bray et al. | |
| 7,054,905 | B1 | * | 5/2006 | Hanna | G06Q 10/107 709/206 |
| 7,249,314 | B2 | | 7/2007 | Walker et al. | |

(Continued)

OTHER PUBLICATIONS

"International Search Report and Written Opinion Issued in PCT Application No. PCT/US2013/075483", dated Mar. 28, 2014, 10 Pages.

(Continued)

*Primary Examiner* — Cheikh Ndiaye

(57) ABSTRACT

Disclosed herein are systems, methods, and software for facilitating collaboration within message environments. In an implementation, a message system receives a request to send on behalf of a sender a message having an attachment. In response to the request, the message system generates a collaborative version of the attachment within a location associated with the sender. The collaborative version of the attachment may be modified to reflect updates initiated on behalf of recipients of the message.

20 Claims, 4 Drawing Sheets

(56) References Cited

U.S. PATENT DOCUMENTS

| | | |
|---|---|---|
| 8,060,820 B2 | 11/2011 | Bedi et al. |
| 8,560,613 B1* | 10/2013 | Rochelle .............. G06Q 10/107 709/205 |
| 2004/0034688 A1* | 2/2004 | Dunn ................... G06Q 10/107 709/206 |
| 2004/0064733 A1* | 4/2004 | Gong ................... G06Q 10/107 726/27 |
| 2004/0172450 A1 | 9/2004 | Edelstein et al. |
| 2004/0230903 A1 | 11/2004 | Elza et al. |
| 2005/0033811 A1 | 2/2005 | Bhogal et al. |
| 2006/0218476 A1 | 9/2006 | Gombert |
| 2008/0046518 A1* | 2/2008 | Tonnison ............. G06Q 10/107 709/206 |
| 2011/0276897 A1 | 11/2011 | Crevier et al. |
| 2012/0198003 A1 | 8/2012 | Schechter et al. |

OTHER PUBLICATIONS

"Final Office Action Issued in U.S. Appl. No. 13/716,088", dated Nov. 5, 2015, 13 Pages.

"Non-Final Office Action Issued in U.S. Appl. No. 13/716,088", dated Mar. 27, 2015, 15 Pages.

"Notice of Allowance Issued in U.S. Appl. No. 13/716,088", dated May 12, 2016, 8 Pages.

"Google Docs—Share and Collaborate in Real Time", Retrieved From: <<http://www.google.com/google-d-s/intl/en/tour2.html>>, Jan. 2011, 2 Pages.

Sasse, et al., "Support for Collaborative Authoring via Email: The MESSIE Environment", In Proceedings of the Third European Conference on Computer-Supported Cooperative Work, Sep. 13, 1993, pp. 249-264.

* cited by examiner

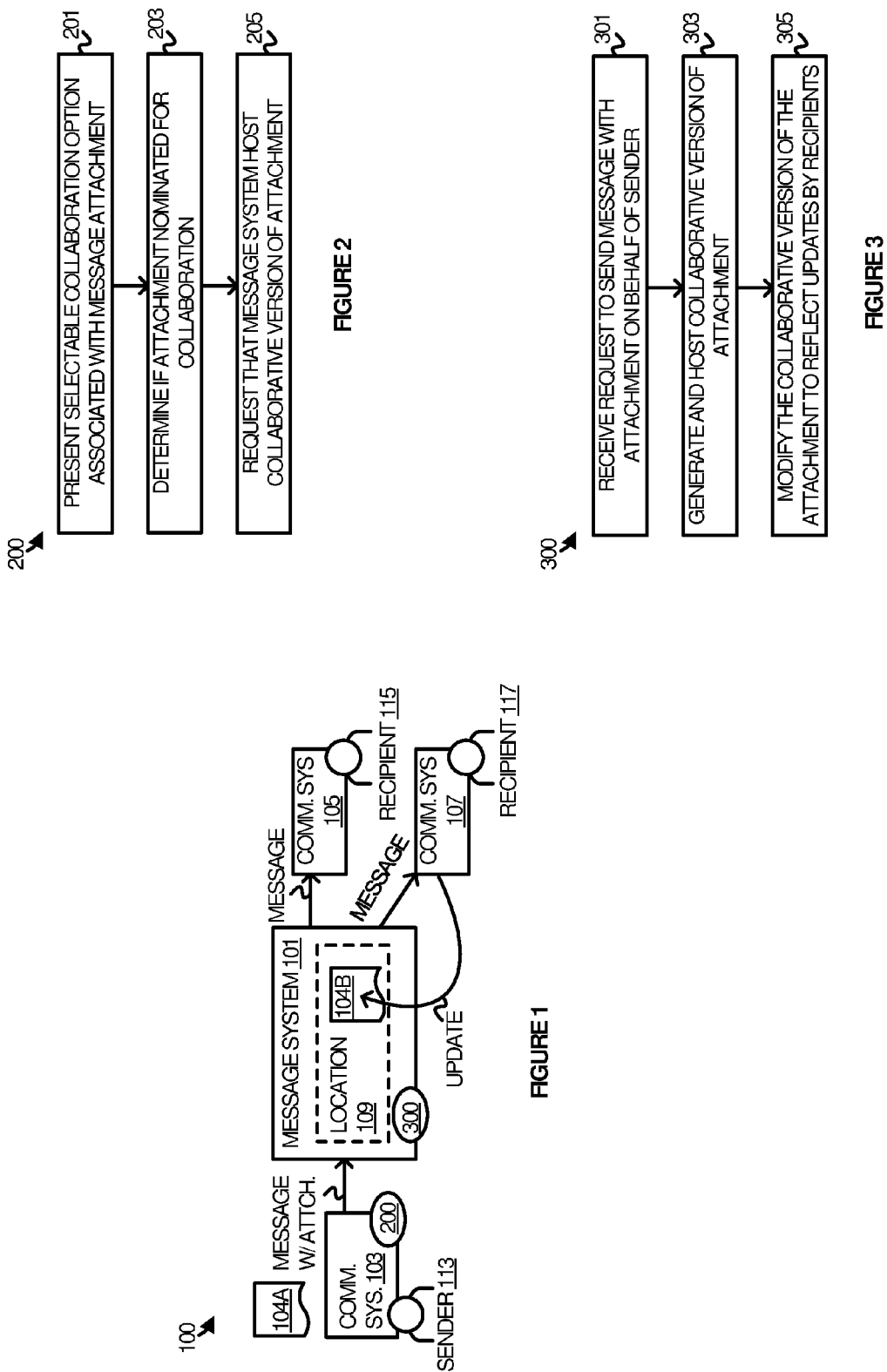

ATTACHMENT COLLABORATION WITHIN MESSAGE ENVIRONMENTS

RELATED APPLICATIONS

This application is a continuation of, and claims the benefit of priority to, U.S. patent application Ser. No. 13/716,088, filed on Dec. 15, 2012, and entitled "Attachment Collaboration Within Messaging Environments," which is hereby incorporated by reference in its entirety.

TECHNICAL FIELD

Aspects of the disclosure are related to computing and communication technology, and in particular, to collaboration within message environments.

TECHNICAL BACKGROUND

Collaboration solutions allow teams or other groups of users to work together on a document, spreadsheet, or other types of content. Users may collaborate in various ways depending on which of a variety of collaboration solutions may be implemented. In one scenario a document may be emailed from a sender to several recipients. A suitable word processing application cable of tracking changes and conveying other edits can be used by each recipient to review the document. Edited copies of the document may then be returned by email to the sender for viewing, merging, or other analysis.

Some scenarios involve collaboration servers to which subject documents or other content may be uploaded such that others may edit the document in one place without having to return an edited copy. For example, a user may post a document to a collaboration server and then distribute a link to the document by email to other users. The other users may navigate to the posted document using the link. Having gained access to the posted document, the other users may make changes, provide comments, or otherwise provide their feedback with respect to the posted document.

More recent scenarios allow users to share documents stored within their own cloud-based storage repositories. Some cloud services provide tools by which a user may distribute a link to a shared document such that recipients of the link may navigate to and edit the shared document. It is also possible for the user to simply copy the link associated with the shared document and manually pasted it into an email destined for the recipients.

OVERVIEW

Provided herein are systems, methods, and software for facilitating collaboration within message environments. In an implementation, a message system receives a request to send on behalf of a sender a message having an attachment. In response to the request, the message system generates a collaborative version of the attachment within a location associated with the sender. The collaborative version of the attachment may be modified to reflect updates initiated on behalf of recipients of the message.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1 illustrates a message environment in an implementation.

FIG. 2 illustrates a collaboration process in an implementation.

FIG. 3 illustrates another collaboration process in an implementation.

TECHNICAL DISCLOSURE

Figure 5:
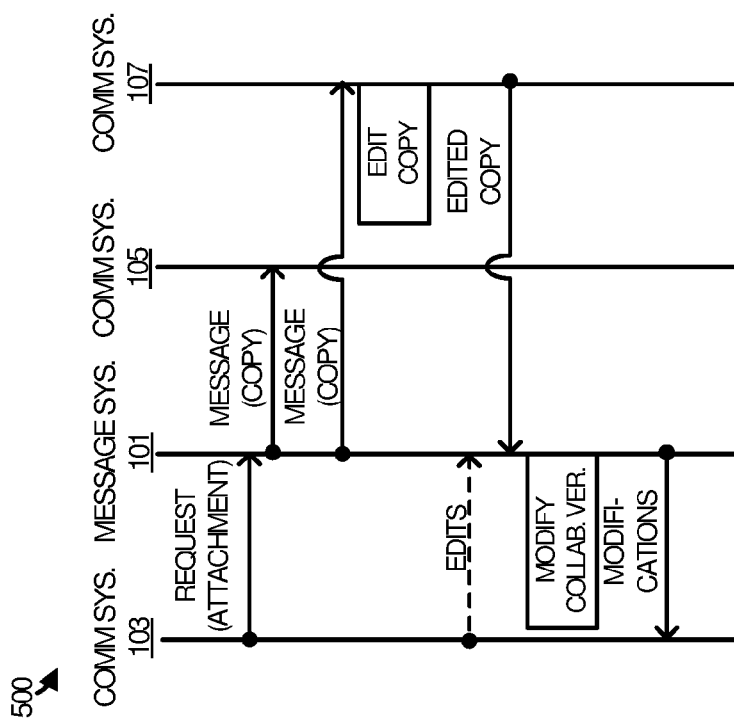
FIG. 5 illustrates another operational sequence in an implementation.

Implementations described herein provide for facilitating collaboration on attachments within email environments. In various implementations, a message may be composed and sent to various recipients with a collaborative version of an attachment that is hosted and shared from within the message system that sends the message. The message may reside within a location in a message environment associated with the sender of the message such that the sender may experience any modifications or other changes to the collaborative version of the attachment from within their message environment. As updates initiated on behalf of the recipients are received, modifications are made to the collaborative version of the attachment by the message system. In some implementations updates initiated on behalf of the sender may also be received and modifications made to the collaborative version of the attachment accordingly.

In some implementations, the message may be an email and the message system may be an email system. In such a scenario, when composing the email the sender may be presented with a collaboration option upon attaching a document, spreadsheet, photo, or other content to the email to create the attachment. The sender may nominate the attachment for collaborative sharing by selecting the collaboration option. A request communicated to the email system to send the email may then indicate that the attachment has been nominated. In this manner, the email system can recognize the collaborative status of the attachment and proceed accordingly. Without nominating the attachment for collaboration, the email system may proceed in a normal fashion my sending the email to its recipients with merely a copy of the attachment, rather than generating the collaborative version and providing access to it via the email.

Access to a collaborative version of an attachment may be provided in a variety of ways. In some scenarios, the message system may communicate the message to each recipient with a reference to the collaborative version of the attachment. The recipient communication systems may then access the collaborative version of the attachment using the reference. In some examples the reference may be a link that points to the collaborative version within the location associated with the sender. In some scenarios each recipient may be provided with a unique link such that access to the collaborative version may be controlled on a per-recipient basis. In other scenarios, a copy of the collaborative version of the attachment may be included with each message sent to the recipients. The recipients can then edit the copy of the collaborative version and reply to the initial message with an edited copy attached thereto. The message system may modify the collaborative version stored within the location associated with the sender based on the changes provided in the edited copy. Other access techniques and variations and combinations of the access techniques disclosed herein are possible and may be considered with the scope of the present discussion.

Figure 4:
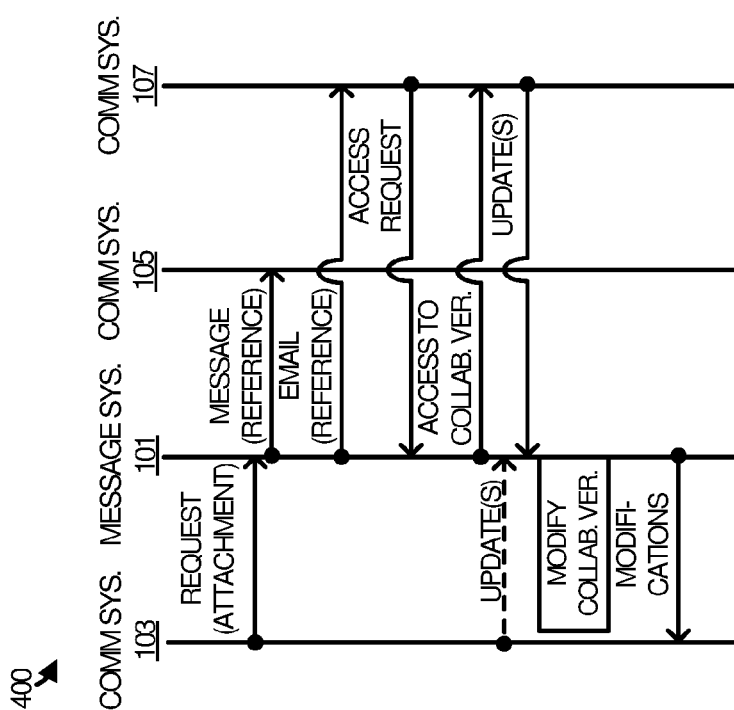
FIG. 4 illustrates an operational sequence in an implementation.
Figures 6, 7:
FIG. 6 illustrates a view of a message in an implementation.
FIG. 7 illustrates a view of contents of a mailbox in an implementation.
Figure 8:
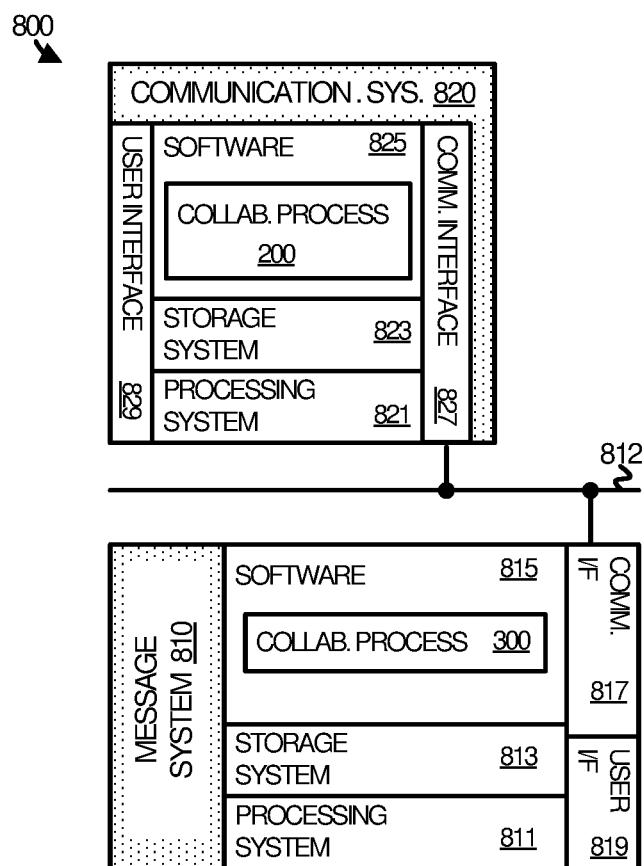
FIG. 8 illustrates a computing architecture in an implementation.

Referring now to the drawings, FIG. 1 illustrates a message environment in which collaboration processes illustrated in FIG. 2 and FIG. 3 may be implemented. FIG. 4 and FIG. 5 illustrate various operational scenarios that may be carried out in the message environment. FIG. 6 illustrates a view of a sample message and FIG. 7 illustrates a view of contents of a sample mailbox. FIG. 8 illustrates a computing architecture suitable for implementing at least portions of the message environment.

Turning to FIG. 1, message environment 100 includes message system 101, communication system 103, communication system 105, and communication system 107. In operation, communication system 103 communicates with message system 101 to send messages on behalf of sender 113 for delivery to recipients, such as recipient 115 associated with communication system 105 and recipient 117 associated with communication system 107. Communication system 103 may also communicate with message system 101 to receive messages initiated by others. Message environment 100 may include other elements in addition to those included herein to facilitate such messaging, such as other message systems, communication networks, links, and the like.

Message system 101 may be any system or collection of systems capable of employing collaboration process 300 and sending and receiving messages on behalf of sender 113. Examples of message system 101 include email servers, exchange servers, unified communication servers, instant messaging servers, or any variation or combination thereof. Examples of messages include emails, instant messages, voice messages, video messages, or any other variation or combination of message capable of having an attachment.

Communication system 103 may be any system or collection of systems capable of employing collaboration process 200 when communicating with message system 101 to send and receive messages on behalf of sender 113. Examples of communication system 103 include tablet computers, laptop computers, desktop computers, mobile phones, smart phones, and gaming systems as well as any variation or combination thereof. Communication system 105 and communication system 107 may each be any system or collection of systems capable of receiving messages initiated by communication system 103, such as tablet computers, laptop computers, desktop computers, mobile phones, smart phones, and gaming systems as well as any variation or combination thereof.

Referring to FIG. 2, collaboration process 200 may be carried out by communication system 103 within the context of employing a messaging application, such as an email or instant messaging client, to interface with message system 101. In some scenarios, the messaging application may be locally installed and executed on communication system 103. In other scenarios, the messaging application may be hosted by an application server and accessed by way of a web browser or other application running on communication system 103. In yet other scenarios, the messaging application may be streamed to communication system 103 and executed therefrom. Collaboration process 200 may be carried out within the context of executing such a messaging application.

In operation, sender 113 may interface with communication system 103 to compose and send messages. When composing a message, sender 113 may desire to include an attachment with the message, such as by attaching a document, spreadsheet, or the like to the message. In the event that sender 113 may include an attachment with a message, communication system 103 presents a collaboration option associated with the attachment to the message (step 201), the selection of which nominates the attachment for collaboration.

When communicating with message system 101 to send the message to recipients, communication system 103 determines whether or not the attachment is nominated for collaboration (step 203). For example, if the collaboration option is selected, then the attachment is nominated for collaboration, and if not, then the attachment is not nominated. In this scenario it is assumed for exemplary purposes that attachment 104A is nominated for collaboration. Accordingly, communication system 103 communicates a request to message system 101 requesting that the message be sent to its recipients and that a collaborative version 104B of attachment 104A be generated and hosted for access by the recipients. The request may be communicated within the context of any well-known message exchange protocol that governs how a communication system may communicate with a message system to accomplish the delivery of messages. It may be appreciated that the sender may also access collaborative version 104B. For example, the sender may access the collaborative version 104B via a sent version of the message sent to the recipients or in some other manner.

Upon execution of collaboration process 200 by communication system 103, message system 101 employs collaboration process 300 to respond to and handle the request to send the email. In particular, message system 101 receives the request to send on behalf of sender 113 the message with attachment 104A (step 301). In response to the request, message system 101 generates collaborative version 104B of attachment 104A within location 109 (step 303). Location 109 may be any location within a message environment, such as message system 101, that is associated with sender 113. Examples of location 109 include a mailbox associated with sender 113 hosted by message system 101.

Message system 101 also sends the message to any recipients listed in the message, assumed to be recipient 115 and recipient 117 for exemplary purposes. Having generated collaborative version 104B and sent the message, message system 101 may receive updates to collaborative version 104B initiated on behalf of recipient 115 or recipient 117 or both. Message system 101 modifies collaborative version 104B accordingly to reflect the updates such that sender 113 may be able to view the feedback provided by recipient 115 and recipient 117 (step 305).

Access may be provided to collaborative version 104B of attachment 104A in a variety of ways, two of which are illustrated by FIG. 4 and FIG. 5. FIG. 4 illustrates operational sequence 400 during which message system 101 includes a reference with each message sent to recipient 115 and recipient 117 respectively. FIG. 5 illustrates operational sequence 500 during which message system 101 attaches a copy of the collaborative version 104 to each message sent to recipient 115 and recipient 117.

Referring to FIG. 4, communication system 103 communicates a request to message system 101 to send a message having a document or some other content attached thereto. The message may include a flag or some other indication that the attachment has been nominated for collaboration. Upon receiving the request, message system 101 generates a collaborative version of the attachment and stores it in a location, such as a mailbox, associated with sender 113. Message system 101 communicates the email for delivery to communication system 105 and communication system 107 with a reference to the collaborative version of the attachment within the location associated with sender 113.

In operational sequence 400, communication system 107 provides an access request to message system 101 using the reference provided in the email. The request may be communicated within the context of any well-known email protocol that governs how emails may be communicated and delivered. An example of an email protocol in accordance with which such requests may be communicated is SMTP (simple mail transfer protocol), although other protocols open and proprietary may be used, as well as any variation or combination thereof.

Message system 101 responsively provides communication system 107 with access to the collaborative version of the attachment such that recipient 117 may edit or otherwise engage with the collaborative version. For example, the collaborative version of the attachment may be opened directly from message system 101 such that recipient 117 may directly edit it using communication system 107. In this manner, communication system 107 provides the updates with which message system 101 modified the collaborative version of the attachment. The modifications are ultimately communicated back to communication system 103 so that sender 113 may view the changes, comments, or other edits made by recipient 117.

In fact, the manner in which the modifications are communicated back to communication system 103 may vary depending upon the implementation. In some scenarios, a message history may include a sent version of the message that itself includes a reference to the collaborative version of the attachment. Upon selecting or otherwise viewing the sent version of the message, communication system 103 may communicate with message system 101 to access the collaborative version, in much the same way as communication system 107. Such access may also occur on a period or continuous basis in the background so that the sent version is updated with the modifications in real-time.

It may be appreciated that updates may also be made to the collaborative version of the attachment on behalf of sender 113. In such a scenario, communication system 103 may access the collaborative version of the attachment hosted by message system 101 using the reference or a variation thereof generated for inclusion with the message sent to recipients 115 and 117. For example, a sent version of the message may include the reference. In another example, the original version of the attachment may include the reference such that opening the original version launches a request to retrieve and open the collaborative version of the attachment. Other mechanisms for accessing the collaborative version of the attachment are possible and may be considered with the scope of the present disclosure. Having opened or otherwise gained access to the collaborative version of the attachment, communication system 103 may communicate updates to message system 101 such that modifications can be made to the collaborative version of the attachment to reflect the updates.

Referring to FIG. 5, communication system 103 communicates a request to message system 101 to send a message having a document or some other content attached thereto. The request may be communicated within the context of any well-known email protocol that governs how emails may be communicated and delivered. An example of an email protocol in accordance with which such requests may be communicated is SMTP (simple mail transfer protocol), although other protocols open and proprietary may be used, as well as any variation or combination thereof.

The message may include a flag or some other indication that the attachment has been nominated for collaboration. Upon receiving the request, message system 101 generates a collaborative version of the attachment and stores it in a location, such as a mailbox, associated with sender 113. Message system 101 communicates the email for delivery to communication system 105 and communication system 107 with a copy of the collaborative version of the attachment.

In operational sequence 500, recipient 117 may edit the copy of the collaborative attachment to make changes, comments, or other edits. Communication system 107 provides the edited copy of the collaborative version to message system 101 which may then update or otherwise modify the collaborative version of the attachment accordingly. For example, message system 101 may compare the edited copy to the collaborative version stored within message system 101. In other scenarios, message system 101 may maintain multiple versions of the collaborative version, such as the original version and any edited versions. The modifications are communicated back to communication system 103 so that sender 113 may view the changes, comments, or other edits made by recipient 117.

It may be appreciated that updates may also be made to the collaborative version of the attachment on behalf of sender 113. In such a scenario, communication system 103 may access the collaborative version of the attachment hosted by message system 101 using the reference or a variation thereof generated for inclusion with the message sent to recipients 115 and 117. For example, a sent version of the message may include the reference. In another example, the original version of the attachment may include the reference such that opening the original version launches a request to retrieve and open the collaborative version of the attachment. Other mechanisms for accessing the collaborative version of the attachment are possible and may be considered with the scope of the present disclosure. Having opened or otherwise gained access to the collaborative version of the attachment, communication system 103 may communicate updates to message system 101 such that modifications can be made to the collaborative version of the attachment to reflect the updates.

As mentioned, the manner in which the modifications are communicated back to communication system 103 may vary depending upon the implementation. In some scenarios, an updated copy of the collaborative version may be returned to communication system 103. The copy may be integrated into a sent version of the message in replacement of or in addition to the attachment as originally sent.

For purposes of clarity and brevity, FIG. 1, FIG. 4, and FIG. 5 illustrate updates made by communication system 107, but it may be understood that updates may also be communicated by communication system 105 on behalf of recipient 115. In fact, it may also be appreciated that the process described above for providing access to the collaborative version and modifying the collaborative version to reflect changes made by senders or recipients may be repeated or followed in a collaborative fashion such that changes made by any participant in a conversation may be reflected in the collaborative attachment when accessed and viewed by other participants.

In one implementation scenario, a sender may attach a document to a message for transmittal to various recipients. A message system handling the message generates a collaborative version of the attachment and sends a reference to the collaborative version along with the message to the various recipients. Upon delivery of the message, the recipients may access the collaborative version simultaneously, sequentially, or out of sequence, to make edits to the collaborative version of the document. As updates are communicated to the message system on behalf of a recipient, the modifications made to the collaborative version of the document are implemented so that any subsequent access to the collaborative version reflects the modifications.

For example, one recipient may make changes to the collaborative version of the document. Another recipient may then subsequently access the collaborative version, at which time the collaborative version is provided to the other recipient with the changes reflected therein. Similarly, the sender may access the collaborative version of the document subsequent to the recipient making the changes. The collaborative version would be presented to the sender with the changes reflected therein.

In another example, one recipient may make changes to the collaborative version of the document and modifications made to reflect the changes. At the meantime, another recipient may make other changes to the attached document off-line, such that the other changes are made with respect to the collaborative version in its original state. Upon coming online, the other changes made by the other recipient may be communicated such that modifications can be made that reflect the other changes. As a result, the most up-to-date state of the collaborative version would include both the changes made by the one recipient and the other changes made by the other recipient.

In some implementations, the message system used to handle the initial message may communicate to the sender or the recipients or both when changes are made to the collaborative version of an attachment. For example, upon a recipient accessing and making changes to a collaborative version of an attachment, the message system may generate and distribute a new message to each participant—the sender and the recipients—alerting them to the changes. In some cases the new message may include a new or updated reference to the collaborative version of the attachment in its updated state.

Updates or changes to a collaborative version of an attachment may also be made on behalf of the sender. The sender may access the collaborative version in the same manner as the recipients, such as by using a reference that links to the collaborative version. Upon the sender editing the collaborative version, the collaborative version in an updated or changed state would be presented to any recipients upon their access using the same reference or a variation of the reference.

FIG. 6 illustrates a view 600 of a message that may be presented to sender 113 by communication system 103. View 600 includes several fields, including field 601 that identifies the recipients of the message. Field 603 identifies recipients that may be copied on the message. Field 605 identifies a subject of the message, while field 607 identifies documents or other content that may be attached to the message. In this implementation, attachment 104A is identified in field 607. In view 600, the message also includes collaboration option 609 which may be selected to nominate attachment 104A or any other attachment for sharing by message system 101. Composition space 611 provides an area for text input.

Upon composing the message, sender 113 may provide a user input corresponding to send button 613. In response to touching, clicking on, or otherwise selecting the send button 613, communication system 103 communicates the request to message system 101 to send the message. Depending upon whether or not collaboration option 609 is selected, the request may also indicate that attachment 104A should be treated as a collaborative attachment, as discussed at length above.

FIG. 7 illustrates a view 700 of contents of a mailbox associated with sender 113. View 700 illustrates with particularity how sender 113 may experience the collaborative version 104B of attachment 104A. In view 700, the mailbox includes a list of folders 701 from which sender 113 may select a particular folder to view. In this example, sent folder 705 is selected. Accordingly, a list of sent messages 711-719 are displayed in a message pane. Within the message pane, any given sent message may be further selected for detailed viewing. In this example, sent message 713 is selected and may be assumed to correspond to the message composed and sent with respect to FIG. 6.

Sent message 713 also includes several fields, including field 723 that identifies the recipients of the message. Field 727 includes the written content of the message input by way of composition space 611 referred to with respect to FIG. 6. Field 725 notably identifies any content that may have been attached to the message.

In this implementation, the content identified in field 725 includes collaborative version 104B of attachment 104A. In other words, sent message 713 includes a reference to or a copy of collaborative version 104B rather than only a copy of attachment 104A. In this manner, when viewing sent messages sender 113 is able to view the most recent version of the document, spreadsheet, or other suitable content represented by attachment 104A, rather than being relegated to viewing only a past version. While view 700 of the mailbox pertains mainly to sent folder 705, it may be appreciated that similar scenarios may unfold with respect to inbox folder 703 and trash folder 707. Just as sent message 713 includes a reference to or copy of collaborative version 104B, so to could messages within inbox folder 703, trash folder 707, or any other folder.

Various aspects may be appreciated from the discussion above. Message environment 100 assists with incorporating multiple feedback streams into an original document or other content after feedback is solicited over email or other types of messaging. Message environment 100 and its operational features provide a document owner with an improved way to collapse an original document and all received documents into a single document having feedback from all participants. At that point the document author can also choose to include or exclude certain changes from specific respondents after reviewing the changes from the respondent.

In some implementations, modifications to a collaborative version of an attachment may be accomplished using merge logic included in Microsoft® Office Document Cache functionality. Before file is sent as a collaborative attachment for review by recipients of a message, it is decomposed into a tree of smaller elements (paragraphs, slides, comments) using a Cobalt protocol handler. The tree is stored in the sender's mailbox as a base for future merges. The information is used to merge future changes into the original document or other content in the same manner as Office Document Cache merges off-line edits into a server copy of a document.

When recipients change the document with their feedback and send the edited document back to the author or sender, the document is decomposed into a tree again inside of the author's inbox and the elements are compared to identify changed ones. When the author browses her inbox with replies, she may be presented with an option to merge the changes from the reply or replies into the original document. The modified document remains in the inbox, and future merges are possible when more changes received.

In the event that multiple replies are received with multiple changes to a document, the author may be presented with an option to merge all of the changes into the original document by repeating the merge process for each reply. This provides an n-way merge procedure for document changes. Each step in the process is a 3-way merge between the original sent copy of the document, the current state of the modified document, and the changes from a particular recipient. This merge is performed using the logic inside Office Document Cache. If a conflicting change is detected between parts of a document tree, the merge interface of a corresponding productivity application may be invoked to allow the author to resolve the conflict manually. The original and merged document may be stored in an author's inbox as object trees. When the author needs to save or print the document, the full version can re-assembled using a Cobalt library.

FIG. 8 illustrates a communication architecture 800 that may be suitable for implementing all or portions of a message environment, such as message environment 100. Communication architecture 800 includes message system 810 in communication with communication system 820 over communication link 812. Message system 810 may be representative of message system 101. Communication system 820 may be representative of communication system 103 and in some implementations may also be representative of communication system 105 and communication system 107.

Message system 810 may be any system or collection of systems suitable for implementing collaboration process 300 or variations thereof. Examples of message system 810 include server computers, cloud computing platforms, and virtual machines, as well as any other type of computing system, variation, or combination thereof.

Communication system 820 may be representative of any system or collection of systems suitable for implementing collaboration process 200 or any variations thereof. Implementing collaboration process 200 may include the local execution, streaming execution, or hosted execution of an associated application, application component, or operating system component having collaboration process 200 embodied therein, as well as any combination or variation thereof. Examples of communication system 820 include mobile computing devices, desktop computers, cell phones, tablet computers, laptop computers, notebook computers, media devices, and gaming devices, as well as any other type of communicate system or device or any combination or variation thereof. Examples of communication system 820 may also include server computers, cloud computing platforms, and virtual machines, as well as any other type of computing system, variation, or combination thereof.

In other words, in various implementation scenarios, collaboration process 200 may be implemented as part of locally installed applications, or modules within other applications, running on a suitable application platform, such as a personal computer, mobile phone, or the like. In other scenarios, the application or applications within which collaboration process 200 is embodied may be hosted by a suitable application platform, such as an application server, with which another application, such as a personal computer, mobile phone, or the like, may interact. In other scenarios, the application or application or applications within which collaboration process 200 may be embodied may be streamed to communication system 820 or some other suitable computing system for local execution. It may be appreciated that collaboration process 200 may be implemented using a wide variety of delivery mechanisms and techniques and a wide variety of communication systems, devices, and other types of computing equipment of which communication system 820 is intended to be representative.

Message system 810 includes processing system 811, storage system 813, software 815, communication interface 817, and user interface 819, which is optional. Processing system 811 is operatively coupled with storage system 813, communication interface 817, and user interface 819. Processing system 811 loads and executes software 815 from storage system 813. When executed by message system 810 in general, and processing system 811 in particular, software 815 directs message system 810 to operate as described herein for collaboration process 300 or variations thereof. Message system 810 may optionally include additional devices, features, or functionality not discussed herein.

Referring still to FIG. 8, processing system 811 may comprise a microprocessor and other circuitry that retrieves and executes software 815 from storage system 813. Processing system 811 may be implemented within a single processing device but may also be distributed across multiple processing devices or sub-systems that cooperate in executing program instructions. Examples of processing system 811 include general purpose central processing units, application specific processors, and logic devices, as well as any other type of processing device, combinations, or variations thereof.

Storage system 813 may comprise any computer readable storage media readable by processing system 811 and capable of storing software 815. Storage system 813 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal. In addition to storage media, in some implementations, storage system 813 may also include communication media over which software 815 may be communicated. Storage system 813 may be implemented as a single storage device but may also be implemented across multiple storage devices or sub-systems co-located or distributed relative to each other. Storage system 813 may comprise additional elements, such as a controller, capable of communicating with processing system 811.

Software 815 may be implemented in program instructions and among other functions may, when executed by message system 810 in general or processing system 811 in particular, direct message system 810 or processing system 811 to operate as described herein for collaboration process 300. Software 815 may include additional processes, programs, or components, such as operating system software or other application software. Software 815 may also comprise firmware or some other form of machine-readable processing instructions executable by processing system 811.

In general, software 815 may, when loaded into processing system 811 and executed, transform message system 810 overall from a general-purpose computing system into a special-purpose computing system customized to facilitate collaboration within message environments as described herein for each implementation. Indeed, encoding software 815 on storage system 813 may transform the physical structure of storage system 813. The specific transformation of the physical structure may depend on various factors in different implementations of this description. Examples of such factors may include, but are not limited to the technology used to implement the storage media of storage system 813 and whether the computer-storage media are characterized as primary or secondary storage.

For example, if the computer-storage media are implemented as semiconductor-based memory, software 815 may transform the physical state of the semiconductor memory when the program is encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that message system 810 is generally intended to represent a computing system with which software 815 is deployed and executed in order to implement collaboration process 300 (and variations thereof). However, message system 810 may also represent any computing system on which software 815 may be staged and from where software 815 may be distributed, transported, downloaded, or otherwise provided to yet another computing system for deployment and execution, or yet additional distribution.

Through the operation of message system 810 employing software 815, transformations may be performed. As an example, message system 810 could be considered transformed from one state to another when subject to collaboration process 300 or variations thereof. In a first state, message system 810 may receive a request to send a message with an attachment. Responsive to the request, a collaborative version of the attachment may be generated and stored within a location associated with the sender, thereby changing message system 810 to a second, different state. The collaborative version of the attachment may also be modified in response to updates initiated on behalf of the recipients, thereby message system 810 to another different state.

Some technical aspects may be appreciated with respect to message system 810. For example, generating and storing a collaborative version of an attachment within a location in a message environment associated with the sender may achieve various operational efficiencies. For example, by incorporating the management of a collaborative version within a message system, running and operating a separate collaboration solution may be avoided in part or entirely, thus saving processing and operational resources.

Referring again to FIG. 8, communication interface 817 may include communication connections and devices that allow for communication between message system 810 and communication system 820 over communication link 812. Examples of connections and devices that together allow for inter-system communication may include network interface cards, antennas, power amplifiers, RF circuitry, transceivers, and other communication circuitry. To facilitate communication link 812, the connections and devices may communicate over communication media to exchange communications with other computing systems or networks of systems, such as metal, glass, air, or any other suitable communication media. The aforementioned communication media, network, connections, and devices are well known and need not be discussed at length here.

Communication system 820 includes processing system 821, storage system 823, software 825, communication interface 827, and user interface 829, which is optional. Processing system 821 is operatively coupled with storage system 823, communication interface 827, and user interface 829. Processing system 821 loads and executes software 825 from storage system 823. When executed by communication system 820 in general, and processing system 821 in particular, software 825 directs communication system 820 to operate as described herein for collaboration process 200 or variations thereof. Communication system 820 may optionally include additional devices, features, or functionality not discussed herein.

Referring still to FIG. 8, processing system 821 may comprise a microprocessor and other circuitry that retrieves and executes software 825 from storage system 823. Processing system 821 may be implemented within a single processing device but may also be distributed across multiple processing devices or sub-systems that cooperate in executing program instructions. Examples of processing system 821 include general purpose central processing units, application specific processors, and logic devices, as well as any other type of processing device, combinations, or variations thereof.

Storage system 823 may comprise any computer readable storage media readable by processing system 821 and capable of storing software 825. Storage system 823 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal. In addition to storage media, in some implementations storage system 823 may also include communication media over which software 825 may be communicated. Storage system 823 may be implemented as a single storage device but may also be implemented across multiple storage devices or sub-systems co-located or distributed relative to each other. Storage system 823 may comprise additional elements, such as a controller, capable of communicating with processing system 821.

Software 825 may be implemented in program instructions and among other functions may, when executed by communication system 820 in general or processing system 821 in particular, direct communication system 820 or processing system 821 to operate as described herein for collaboration process 200. Software 825 may include additional processes, programs, or components, such as operating system software or other application software. Software 825 may also comprise firmware or some other form of machine-readable processing instructions executable by processing system 821.

In general, software 825 may, when loaded into processing system 821 and executed, transform communication system 820 overall from a general-purpose computing system into a special-purpose computing system customized to facilitate attachment collaboration as described herein for each implementation. Indeed, encoding software 825 on storage system 823 may transform the physical structure of storage system 823. The specific transformation of the physical structure may depend on various factors in different implementations of this description. Examples of such factors may include, but are not limited to the technology used to implement the storage media of storage system 823 and whether the computer-storage media are characterized as primary or secondary storage.

For example, if the computer-storage media are implemented as semiconductor-based memory, software 825 may transform the physical state of the semiconductor memory when the program is encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that communication system 820 is generally intended to represent a computing system with which software 825 is deployed and executed in order to implement collaboration process 200 (and variations thereof). However, communication system 820 may also represent any computing system on which software 825 may be staged and from where software 825 may be distributed, transported, downloaded, or otherwise provided to yet another computing system for deployment and execution, or yet additional distribution.

Through the operation of communication system 820 employing software 825, transformations may be performed. As an example, communication system 820 could be considered transformed from one state to another when subject to collaboration process 200 or variations thereof. In a first state, communication system 820 may present a collaboration option associated with an attachment to a message. Responsive to a selection of the collaboration option, communication system 820 may communicate a request to send the message with a collaborative version of the attachment, thereby changing communication system 820 to a second, different state.

Some technical aspects may be appreciated with respect to communication system 820. For example, nominating an attachment for collaboration occurs within the context of composing a message. A user may select a collaboration option within an email composition view or window within the work flow of sending the email, rather than having to accomplish such a task separately from sending the email. This may achieve various operational efficiencies, such as reduced processing steps or improved energy utilization due to the fact that less steps are performed than otherwise may be.

Referring again to FIG. 8, communication interface 827 may include communication connections and devices that allow for communication between communication system 820 and message system 810 over communication link 812. Examples of connections and devices that together allow for inter-system communication may include network interface cards, antennas, power amplifiers, RF circuitry, transceivers, and other communication circuitry. To facilitate communication link 812, the connections and devices may communicate over communication media to exchange communications with other computing systems or networks of systems, such as metal, glass, air, or any other suitable communication media. The aforementioned communication media, network, connections, and devices are well known and need not be discussed at length here.

User interface 829 may include a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 829. In some cases, the input and output devices may be combined in a single device, such as a display capable of displaying images and receiving touch gestures. The aforementioned user input and output devices are well known in the art and need not be discussed at length here. User interface 829 may also include associated user interface software executable by processing system 821 in support of the various user input and output devices discussed above. Separately or in conjunction with each other and other hardware and software elements, the user interface software and devices may provide a graphical user interface, a natural user interface, or any other kind of user interface.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. One or more computer readable storage media comprising program instructions stored thereon for facilitating document collaboration within a message environment that, when executed by a computing system, directs the computing system to at least:
   receive a request to send, on behalf of a sender, a message having an attachment;
   in response to the request, determine whether a collaboration option is selected in the message;
   if the collaboration option is selected, then generate a collaborative version of the attachment at a location within the message environment associated with the sender and send the message to a plurality of designated recipients of the message with a reference to the collaborative version of the attachment; and if the collaboration option is un-selected, then send the message to the plurality of designated recipients of the message with the attachment.

2. The one or more computer readable storage media of claim 1, wherein the program instructions further direct the computing system to modify the collaborative version of the attachment to reflect a plurality of updates initiated on behalf of a plurality of recipients of the message, and wherein the message comprises an email message.

3. The one or more computer readable storage media of claim 2, wherein the location in the message environment associated with the sender comprises a mailbox associated with the sender accessed on behalf of the plurality of designated recipients using the reference.

4. The one or more computer readable storage media of claim 3, wherein in generating the collaborative version of the attachment, the program instructions direct the computing system to access the mailbox to modify a version of the attachment.

5. The one or more computer readable storage media of claim 4, wherein the program instructions further direct the computing system to generate and store, in the mailbox, a sent version of the message that includes the reference to the collaborative version of the attachment.

6. The one or more computer readable storage media of claim 2, wherein the reference to the collaborative version of the attachment comprises a link to the location in the message environment with which to access the collaborative version of the attachment, and wherein at least one of the plurality of updates comprises a direct edit of the collaborative version of the attachment accessed using the link.

7. The one or more computer readable storage media of claim 2, wherein the reference to the collaborative version of the attachment comprises a copy of the collaborative version of the attachment, and wherein at least one of the plurality of updates comprises an edited version of the copy of the collaborative version of the attachment.

8. The one or more computer readable storage media of claim 1, wherein the program instructions further direct the computing system to determine whether the attachment is nominated for collaboration, wherein the program instructions direct the computing system to generate the collaborative version of the attachment in response to determining that the attachment is nominated for collaboration.

9. A method of operating a message system to facilitate document collaboration within a message environment, the method comprising:

receiving a request to send, on behalf of a sender, a message having an attachment;

in response to the request, determining whether a collaboration option is selected in the message;

if the collaboration option is selected, then generating a collaborative version of the attachment within a location in the message environment associated with the sender and sending the message to a plurality of designated recipients of the message with a reference to the collaborative version of the attachment; and if the collaboration option is un-selected, then sending the message to the plurality of designated recipients of the message with the attachment.

10. The method of claim 9, further comprising modifying the collaborative version of the attachment to reflect a plurality of updates initiated on behalf of a plurality of recipients of the message, and wherein the message comprises an email message.

11. The method of claim 10, wherein the location in the message environment associated with the sender comprises a mailbox associated with the sender accessed on behalf of the sender and the plurality of designated recipients using the reference.

12. The method of claim 11, wherein the generating of the collaborative version of the attachment comprises accessing the mailbox to modify a version of the attachment.

13. The method of claim 12, further comprising generating and storing, in the mailbox, a sent version of the message that includes the reference to the collaborative version of the attachment.

14. The method of claim 10, wherein the reference to the collaborative version of the attachment comprises a link to the location in the message environment with which to access the collaborative version of the attachment, and wherein at least one of the plurality of updates comprises a direct edit of the collaborative version of the attachment using the link.

15. The method of claim 10, wherein the reference to the collaborative version of the attachment comprises a copy of the collaborative version of the attachment, and wherein at least one of the plurality of updates comprises an edited version of the copy of the collaborative version of the attachment.

16. The method of claim 9, further comprising determining whether the attachment is nominated for collaboration, and wherein the generating of the collaborative version of the attachment occurs in response to determining that the attachment is nominated for collaboration.

17. A computing apparatus comprising:

one or more computer readable storage media; and program instructions stored on the one or more computer readable storage media for facilitating content collaboration that, when executed by a processing system, direct the processing system to at least:

present a view of an email having an attachment;

present a collaboration option in the view that, when selected, nominates the attachment for collaboration; and when communicating with a message system to send the email to a plurality of designated recipients on behalf of a sender, is configured to:

send the email to the plurality of designated recipients with a reference to the collaborative version of the attachment when the attachment is nominated for collaboration, and if the attachment is not nominated for collaboration, request that the message system send the email with the attachment to the plurality of designated recipients.

18. The computing apparatus of claim 17, wherein the program instructions further direct the processing system to store a record of the email including a reference with which to access the collaborative version of the attachment and a plurality of updates to the collaborative version of the attachment initiated on behalf of a plurality of recipients.

19. The computing apparatus of claim 18, wherein at least one of the plurality of updates comprises a one of a direct edit of the collaborative version of the attachment and an edited version of the copy of the collaborative version of the attachment.

20. The computing apparatus of claim 17, wherein the computing apparatus further comprises the processing system configured to execute the program instructions, and wherein the location in the email system associated with the sender comprises a mailbox associated with the sender exposed to modifications on behalf of the sender and a plurality of recipients.

\* \* \* \* \*